M. H. BAKER, DEC'D.
M. H. BAKER, ADMINISTRATRIX.
THERMODYNAMIC EXTINGUISHING DEVICE FOR LAMPS.
APPLICATION FILED APR. 26, 1915. RENEWED NOV. 17, 1919.

1,350,588.

Patented Aug. 24, 1920.
3 SHEETS—SHEET 1.

WITNESSES:
Ernest L. Fuller.
Raymond D. Smith

INVENTOR.
Malcolm H. Baker.

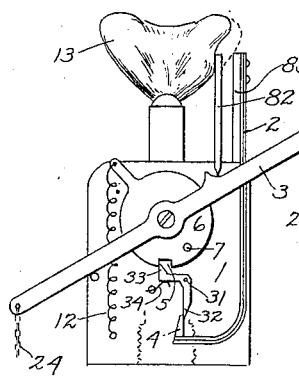
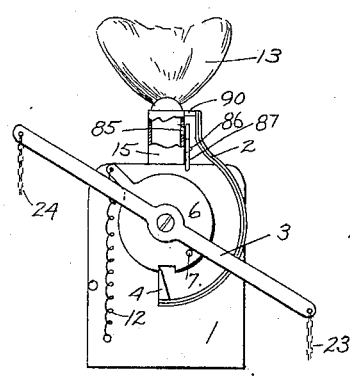

UNITED STATES PATENT OFFICE.

MALCOLM H. BAKER, OF BRAINTREE, MASSACHUSETTS; MARIE H. BAKER ADMINISTRATRIX OF SAID MALCOLM H. BAKER, DECEASED, ASSIGNOR TO KENNETH W. CROSBY, TRUSTEE, OF BOSTON, MASSACHUSETTS.

THERMODYNAMIC EXTINGUISHING DEVICE FOR LAMPS.

1,350,588.   Specification of Letters Patent.   Patented Aug. 24, 1920.

Application filed April 26, 1915, Serial No. 23,991. Renewed November 17, 1919. Serial No. 338,525.

*To all whom it may concern:*

Be it known that I, MALCOLM H. BAKER, a citizen of the United States, and a resident of Braintree, in the county of Norfolk and Commonwealth of Massachusetts, have invented certain new and useful Improvements in Thermodynamic Extinguishing Devices for Lamps, of which the following is a specification.

My invention relates to all classes of lamps in which heat is generated by the production of light, and specifically to gas, electric, and kerosene, or oil, lamps.

The objection of my invention is to provide means whereby a brief interval shall elapse between the usual manual act of "turning off" the light and the actual extinguishment of the said light.

The advantages of such an arrangement are obvious, particularly in cases, and these are almost universal in domestic use, where light is desired for a period, more or less brief, after the manual operation of extinguishment has taken place.

I am well aware that many devices exist for causing the automatic extinguishment of a lamp at certain predetermined time after it has been lighted,—and for automatically lighting and extinguishing a lamp at certain hours,—but my device is not of this character, and meets a condition which none of these could practically fulfil.

My invention is adapted to be applied to any of the above types of lamps in a simple and self-contained manner, and provides means whereby the lamp is lighted and operated, for any desired time, in the usual manner, and also provides means whereby a continuance of light is secured, as stated, for a definite period after the "turning off" act has been performed. The conditions, in domestic use, for instance, where this is of specific advantage are in bed chambers,—to allow time for retiring,—in cellars or otherwise dark rooms to insure light while leaving the said rooms,—in hall ways, to insure light while ascending or descending stairs therefrom,—on piazzas, porches, and in many other locations.

In commercial use, also, the same requirement exists, as for instance in stores and factories which are closed after dark, in which case the last person to extinguish the light often suffers considerable inconvenience in leaving the premises.

In fact it may be broadly stated as applicable to all types of lamps, and particularly to gas and electric lamps, as being in general non-portable, that the universal requirement is for a continuance of light for at least one minute after the act of "turning off" has been performed, it being extremely difficult to think of a case in which such continuance would not be a very decided advantage, not only of convenience but also as a preventive of accidents.

In carrying out my invention I provide means, in this application comprising thermo-dynamic means, to control the extinguishing mechanism and extinguish the lamp a definite time after the "turning off" means have been actuated, which actuation usually consists of a mere reversal of the means operative to light the lamp. In the present invention I provide a thermo-dynamic device located in movable thermal relation to the source of heat of the lamp, and so arrange the said device as to cause a change of its said thermal relation to result in extinguishment of the light, the time element required being attained through the time taken by the said device to alter its thermal state after the said thermal relation has been changed.

That is, I provide a thermo-dynamic device in movable thermal relation to the source of heat of the lamp, and arrange that the said thermo-dynamic device shall be either thrown into or out of thermal operative relation to the source of heat by the action of turning off the said lamp, and also arrange extinguishing mechanism to be actuated by the movement produced in said thermo-dynamic device by the said change of thermal relation thereof with the source of heat.

Incidentally, my invention, when applied to gas lamps, possesses, in one of its forms, a decided additional advantage, in that it provides for the automatic cutting off of the gas supply in case the flame is extinguished without proper closing of the valve, as is the case if the flame is blown out.

I have illustrated my invention in the annexed drawings, in its various forms, the said drawings being largely diagrammatic in character in order to show the arrangements and operations of the elements in a simple manner.

In the drawings Figures 1, 2, and 3 are front elevations and Fig. 4 a side elevation of my invention, three stages of operation being shown, and Fig. 5 a front elevation of a modified form. Fig. 6 is a similar elevation of another form. Figs. 7 and 8 are side and front elevations, respectively, largely diagrammatic, of application of my invention to an oil lamp burner, and Fig. 9 is a similar elevation of same applied to an electric light bulb. Figs. 10, 11, and 12, are elevations of three further modifications, using gas burners, Fig. 13 shows application to a mantle gas burner, and Figs. 14 and 15 show respectively front and side elevations of another form on an ordinary gas burner. Fig. 16 shows still another modification, and Fig. 17 a further type. Fig. 18 again illustrates an electric bulb adapted, however, to cause decreasing in place of extinguishment of light. Figs. 19 and 20 are elevations applied to mantle gas burners and showing further modifications, and Fig. 21 shows a further type on an ordinary gas burner. Fig. 22 illustrates direct control of a gas valve by the thermal means and Fig. 23 shows means to temporarily cool the thermocouple by means of a cooling mass of metal. Fig. 24 illustrates a burner in which the light is decreased, but not extinguished, by the thermal control.

In the drawings, in Figs. 1, 2, 3, 4, the body of the burner structure appears at 1, and the internal threaded means whereby same is screwed to a gas pipe is indicated at 14. This part 14 is indicated in only a fragmentary manner in many of the figures as it forms no part of the invention. The tube, or stem, of the burner is shown at 15, the tip at 16, and the flame, (except in Fig. 3) at 13. A thermo-dynamic couple, composed of two or more metals of unequal expansibilities, appears at 2, and is attached to a block 9 formed of some material of high thermal conductivity, such as copper. An additional strip 47, also of copper, rests loosely against the more expansible strip of the couple 2 to assist in the heating thereof. The block 9 carries an arm 10 pivoted at 20 and provided with an in-turned end 55 at its upper end and, at the other end, with extensions or fingers 21, 22.

The usual gas valve appears at 25 (in Fig. 4) and is held by screw 18 and washer 19. This valve 25 carries, fixed to its forward end, a disk 6 having a slot 5. An arm 3 is loosely pivoted to said disk by means of a screw 17, and carries pull chains 23, 24, and also an extension 8 adapted to operate the arm 10, as later set forth. A spring 12 is attached to the body 1 at 28 and to the disk 6 by means of another extension thereof 27.

Operation is as follows,—When the chain 23 is pulled, the arm 3 is swung, engages a stop pin 7 in the disk 6, rotates the said disk to turn the valve to the open position, and at the same time swings the arm 10 away from the tip 16 by engagement of the extension 8 with the finger 21. The valve is now locked open by engagement of the catch 4, carried by the couple 2, with the slot 5. This arrangement of parts is shown in Fig. 1. The flame may now be ignited and the burner operated as long as desired, as a simple gas burner. When it is desired to extinguish the burner, the chain 24 is pulled which swings back the arm 3, leaving the valve still locked open however, causes extension 8 to engage finger 22, and thus moves the arm 10 to carry the portion 55 thereof into thermal relation with the flame 13. This position is shown in Fig. 2. The arm 10 now transmits heat from the flame 13 to the block 9, heats the said block, and therefrom heats and actuates the couple 2 which latter out-bends and frees the catch 4 from the slot 5, whereby the spring 12 is permitted to close the valve and extinguish the light. It will be apparent that quite a time element is introduced during the heating of the block 9 and the transference of heat therefrom to actuate the couple 2, and that during the said time element the light is burning unimpaired. Fig. 3 shows extinguishment.

In Fig. 5, the arrangement of parts is such that when the chain 23 is pulled the arm 10 is thrown, by engagement of parts 8 and 29, into thermal relation with the flame 13 as soon as same has been ignited by the operator. The valve disk 6 is locked open by engagement of the catch 33 in slot 5, the catch 33 being pivoted at 31 and actuated, to tend to properly engage in the slot 5, by a spring 34. The thermo-couple 2, now arranged with the more expansible metal on the outside, is at once heated, bends inwardly, causes the catch 4 to pass over the end 32 of the small pivoted arm and to take the position shown in the figure, in which figure all the parts are shown in the locations assumed after the gas has been lighted for a few moments, or for a sufficient time for the heat of the flame to be transmitted to actuate the couple 2 as described.

When the desired time of extinguishment arrives, the chain 24 is pulled, which operates to swing back the arm 3 and, through the engagement of parts 8 and 30, to move the arm 10 out of thermal relation to the flame 13, the valve meantime remaining locked open, as usual. The couple 2 now cools, bends outwardly, presses catch 4 against end 32, and thus throws catch 33 out of slot 5, permitting the spring 12 to shut off the gas. The movement of the couple 2, in fully cooling, also carries the catch 4 past and to the other side of the end 32, to the position first described. It will be noted here that a considerable interval of time must elapse between the pull of the chain 24 and the extinguishment of the flame, as the block 9, acting as a heat reservoir, must cool before the couple 2 is actuated. This form of my invention also possesses the advantage that, if the gas be blown out or otherwise accidentally extinguished the valve is shortly closed.

In all of the above described figures the gas, when turned on, must be turned full on, but in Fig. 6 I show a form which permits adjustment of the supply of gas manually to any desired degree, within the limits of thermal operation of the device. In this figure, the valve disk 36 is attached directly to the arm 3,—that is, the setting of the valve is directly controlled by the said arm,—so that when the chain 23 is pulled the valve may be opened, or adjusted, together with chain 24, as desired. And, moreover, the gas may be cut off without any time interval by a pull of said chain 24. So far, therefore, the device is an ordinary gas burner of the chain pull type. When it is desired to extinguish with time interval, the third chain 35, attached to the disk 37, is pulled. This rotates the said disk 37, which is freely movable with relation to the valve disk 36, until the catch 4 of the thermo-couple 2, engages in the slot 45. This movement of the disk 37 also causes the extension thereof 41 to engage the finger 40 of the arm 10 and to thus throw the said arm into thermal relation to the flame 13. The parts are shown in this relation in the figure. The block 9 now heats, actuates the couple 2, and releases the catch 4 to permit the spring 12 to rotate backward the disk 37. This disk also carries a small catch 43, governed by a small spring 46, which engages in a slot 44 of the valve disk 36, and thereby closes the valve, no matter at what degree of opening the valve may be set. At the same time the arm 10 is moved away from the burner tip 16 by the engagement of the extension 41 and finger 42. This form affords a high degree of flexibility, since the flame may be turned on and regulated as desired, the only essential being that a flame of sufficient size must be maintained, as a minimum, to actuate the thermo-couple when a time extinguishment is desired.

In Figs. 7 and 8, the member 71, shown partially sectioned, in Fig. 7, is pivoted at 72 so that it may be swung over the wick 77 to extinguish the flame. A member 48, preferably of copper, is pivoted at 73 to the copper block 79, and carries a chain 75. The block 79 also carries the usual thermo-couple 2 and catch 81 adapted to engage end 80 of arm 71, whereby said arm is maintained out of the extinguishing position, against the action of the spring 12. This spring is attached to said arm at 69 and to the body of the burner at 78. The arm 48 has an extension 49 adapted, when said arm is drawn back, to engage another extension 70 of the member 71 and thus to also retract the latter. Operation is as follows, the parts being as shown in the figure, with the flame in operation. When it is desired to extinguish with time interval, the chain 75 is pulled, which moves the arm 48 into thermal relation to the flame 13, heats said arm and thereby the block 79, and couple 2, and frees the catch 81 from the end 80 to permit the spring 12 to move the member 71 to extinguish the flame. When it is desired to re-light the lamp, a second chain, shown at 76, is pulled, which swings back the arm 48 and with it the member 71, which is then locked back by engagement of parts 80, 81.

In Fig. 9, the usual electric light bulb appears at 65. An arm 56, pivoted at 54, is provided with extensions carrying pull chains 52, 53, and also carries an insulated spring 63 having a contact 62. It also carries a thermo-couple 59 having, at its upper end, a catch 58 adapted to engage a catch 57,—and a contact 61 adapted to engage the contact 62. Operation is as follows,—To extinguish, the chain 52 is pulled, which swings the couple 59 into thermal relation to the bulb by causing the portion 64, made preferably of copper, to contact with said bulb. The couple 59 is now actuated, frees the catch 58 from the catch 57, opens the contacts 61, 62, and extinguishes the light,—since said latter contacts are in series with the lamp filament by means of wires 66, 67, arm 56, couple 59, contacts 61, 62, spring 63, and wire 68, to terminals 50, 51. Parts are shown in figure just after chain 52 is pulled.

To re-light, chain 53 is pulled, which swings arm 56 and forces the couple 59 against the stop pin 60, whereby the catches 57, 58, are engaged and the contacts 61, 62, closed.

In Fig. 10, the same means are used to control the valve as appear in Fig. 5, the couple 2 being thermally related to the flame 13 while the lamp is in normal operation. To extinguish, the chain 24 is pulled which throws the movable barrier 82, diagrammatically indicated, up into the flame 13 and deflects the same out of operative thermal relation to the couple 2, which then cools and acts as usual to permit the valve to close. At the time the chain 24 is pulled, and before the couple 2 acts, the parts are as shown in the figure. To turn on the gas to re-light, the chain 23 is pulled, causing the arm 3 to open the valve and also to permit the barrier 82 to fall out of a position of interference with the flame 13. Action is then as in Fig. 5.

In Fig. 11 a small auxiliary vent 85 is shown in the stem 15, and is closed by a swinging plate 87 pivoted to stem at 86. The parts are shown in normal operating manner with the said vent closed by said plate. To extinguish, the chain 24 is pulled, the arm 3 swung, and the vent 85 opened by engagement of said arm 3 with a lower extension of the plate 87. Gas escaping from said vent is now ignited by the main flame 13, and heats the couple 2 against the upper end of which it is directed. The gas is now turned off in the usual manner by the spring 12.

In Fig. 12, the tip 16 is set in a movable ring 94 seated in the top end of the stem 15. When the valve is open, as shown in the figure, the extension 92 of the arm 3 has engaged the extension 93 of the ring 94 and has thus swung the tip to a position adapted to locate the main flame 13 with its plane as shown, and out of operative thermal relation to the couple 2. To extinguish, the chain 24 is actuated, which moves back the arm 3, causes the extension 89 to engage the extension 93, and thus to rotate the tip 16, and flame 13, so that the latter assumes the position shown in the figure by broken lines, at which position the said flame heats and actuates the couple 2 to permit closing of the valve by the spring 12.

Fig. 13 shows application to a gas mantle. Here the mantle 95 is supported by a frame 96 of high thermal conductivity, so that said frame is heated during normal operation of the burner. A similarly conductive arm 97 is pivoted at 98 to a conductive block 9 carrying a couple 2. The arrangement of valve controlling mechanism is similar to that shown in Fig. 10, and the parts are shown in the normal burning position. To extinguish, the chain 24 is pulled, the arm 3 swung, the extension 101 caused to engage extension 100 of arm 97, and said latter arm thus thrown out of thermal contact with the block 96 interrupting the transmission of heat to the couple 2, which cools and causes extinguishment of the lamp. To re-light, the chain 23 is pulled, whereby the valve is opened and the arm 97 thrown into engagement thermally with the bracket 96.

In Figs. 14, 15, a thermo-expansible rod 102 is shown mounted in a swinging bracket 103 which is pivoted at 114. This rod 102 actuates, at 105, a short lever 104 pivoted at 108 and engaging at 106 with a second lever 116 pivoted at 109. The lower portion of said lever is joined by a stiff spring 111 to a catch member 4 adapted to engage in the slot 5 of the valve disk 6. To extinguish, the chain 24 is pulled, the arm 3 swung, the right hand portion of the said arm caused to engage the extension 112 of the bracket 103, and the rod 102 thus moved over the flame 13 and into thermal relation therewith. This is accomplished without operatively disturbing the engagement of the catch 4 with the slot 5. The parts are thus shown in the figure. The rod 102 now expands, and causes the valve to close. To open the valve, the chain 23 is pulled, which swings the arm 3, opens the valve, and causes the right hand portion of said arm also to engage the lower extension 113 of the bracket 103 and thus to swing the rod 102 away from the tip of the burner.

Fig. 16 shows a thermo-couple 117 adapted to be itself swung up over the burner flame and into thermal relation therewith. When the chain 24 is pulled, to extinguish, the arm 3 engages the upper extension 122 of the couple 117, and moves the same into said thermal relation to the flame. The couple 117 is pivoted at 123 in a fixed manner, laterally, and at 118 in a manner adapted to permit lateral movement, by means of an axle 119 therethrough. Therefore when 117 heats and bends out, the catch 120 is moved out of engagement with the slot 5 and the valve thus permitted to close. When the chain 23 is pulled, the valve is again opened, and the couple 117 swung away from the burner by engagement of the arm 3 with the lower extension 121 of said couple.

Fig. 17 shows a thermo-expansible rod 124 related to the flame 13 by means of the parts 10, 9, and operating to close the valve in the usual manner.

Fig. 18 shows application to an electric light bulb, in the same manner as shown in Fig. 9. In the present case, however, the light is decreased instead of being extinguished. Here the contacts 61, 62, are opened in the usual manner, but immediately after such opening second contacts 131, 128, are closed, thus again completing the lamp circuit through the filament and also through the resistance 130, so that a lower current with lessened light results.

In Fig. 19 an expansible rod 132 is shown as surrounded by a tube of thermally conductive material, such as copper, and attached to the upper end of the said tube, shown at 133. The rod 132 is pivoted at its lower end to an arm 134 which has a fulcrum at 135. Said arm also carries, by means of a stiff spring 136, the usual catch 4. A heat conductive arm 137 is pivoted to the block 9 and adapted to engage the bracket 96 of the gas mantle 95. When the chain 23 is pulled, the arm 3 opens the valve and the arm 137 is moved out of contact with 96 by engagement of finger 138 with lower end of said arm. When chain 24 is pulled, the arm 137 is moved into contact with 96 by engagement of right hand portion of 3 with lower end of 137. Heat is now gradually transmitted to rod 132 which expands, frees catch 4 from valve disk 6 and permits spring 12 to close the valve. The parts are shown, in the figure, just after chain 24 has been pulled and before rod 132 has expanded.

Figure 22:
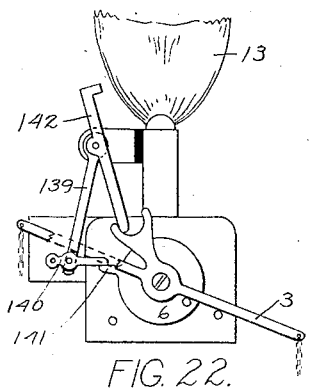

Fig. 22, in which arm 3 is also shown partially cut away, represents direct control of the gas valve by the thermal device. Here the rod 139 is arranged to directly close the valve by means of the extension 141 thereof. In this arrangement the valve motion, required to close the valve, is slight since but small increments of motion are received as rod 139 expands. It is evident that when said rod is cool it offers no interference to the opening of the valve. It is of course also apparent that leverage systems may be arranged to magnify the expansion of the rod 139 as desired, but in present figure only simple elements are shown.

Figure 23:
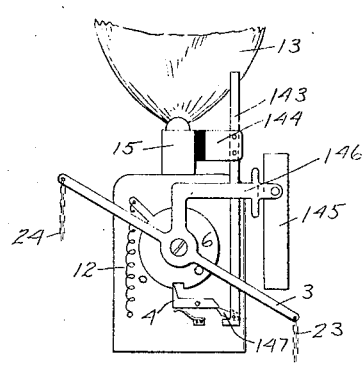

In Fig. 23 the expansible rod 143 is attached to the block 144 carried by the burner stem 15, and extends upwardly into thermal relation with the flame 13, so that said rod is expanded while lamp is burning. A metal block 145, of high thermal conductivity, preferably copper, is carried in swinging adjustment by the arm 146 which forms an extension of the chain arm 3. The parts are shown in normal operative positions. To extinguish, the chain 24 is pulled, which swings the block 145 against the rod 143, cools said rod, causes same to contract, and thus frees catch 147, carried by 143, from the end of the catch arm 4 and at the same time swinging said catch 4 to free the valve disk and permit spring 12 to close the valve.

Figure 24:
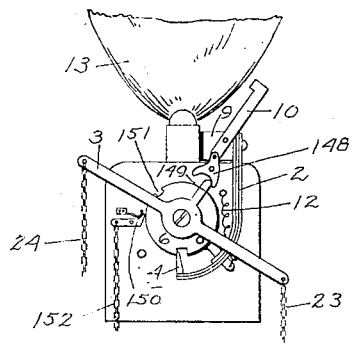

In Fig. 24 the thermo-couple 2 is arranged in thermal relation to the flame 13 in the usual manner, but operates to decrease, not extinguish, the gas, as follows. When chain 24 is pulled, the extension 149 engages arm 148 which in turn swings arm 10 into thermal relation to 13. The couple 2 now bends to free catch 4 from valve disk 6, and the spring 12 then rotates said disk toward the closed position of the valve. The valve is, however, prevented from fully closing by the catch 150 which engages the slot 151 in said disk and arrests the valve at a point adapted to give a decreased flame, under which condition operation now continues.

When it is desired to fully extinguish the flame, a third chain, shown at 152, is pulled. This frees catch 150 from slot 151 and permits spring 12 to fully close the valve.

In general, in certain of the figures where it might be particularly desirable to insulate, thermally, the heated portions of the burner from the structure thereof, I have indicated, in certain locations, insulation for that purpose.

In the above figures I have in general shown the gas valve as of the usual rotary type, but it is of course evident that any form of valve controlled in any desired manner by the thermo-dynamic means might be employed. And it is also evident that any form of valve control, as regards manual control, other than the chain pull shown, might be used.

In the various forms of the invention shown, considerable latitude as regards time interval before extinguishment, is exhibited. In forms in which the thermo-dynamic device is acted upon directly by the flame the said interval is of course brief, merely a few seconds, while in forms in which the heat is transmitted, in the various manners shown, the said interval may run into minutes. It is evident that fairly large ranges, comparatively, are possible by the proper design and arrangement of the thermo-dynamic parts.

It will be evident from the foregoing that the essence of my invention comprises the extinguishment of a lamp a definite time after the extinguishing means have been actuated, and without in any manner interfering with the normal operation of the lamp or the duration of such operation,—and with no reference to the time of operation of the lamp previous to the actuation of the said extinguishing means.

In the present application I have shown the extinguishing means as comprising thermo-dynamic elements actuated broadly by the heat of the lamp and specifically by an alteration of thermal relation to the said lamp as regards its source of heat. And that, broadly, this is caused by relatively moving the thermo-dynamic elements and the source of heat of the lamp while the lamp is in operation. And also, in the case of gas burners for instance, by rotating or otherwise moving the flame, or by interposing a barrier between the flame and the thermo-dynamic device to lessen the transference of heat to the latter, or, to a controlled degree, decreasing the flame,—all such variations of the invention being directed, however, to the broad purpose of producing a change of thermal relation between the thermo-dynamic elements and the source of heat of the lamp, while the said lamp is in operation,—that is, previous to the extinguishment thereof and while the lamp is operating under normal conditions as regards its source of heat.

Thus a sharp distinction is drawn between my invention and any device adapted to operate through the extinguishment of the light, or through a lessening of the amount of heat emitted by the lamp, such as would be caused in a gas burner flashing device by reduction in size of flame or such as any of the many devices adapted to cut off the gas supply, by thermally governed means, when the gas is accidentally blown out or otherwise extinguished without closure of the valve.

Otherwise expressed, the present invention deals with an alterable thermal relation between a source of heat and a thermo-dynamic device both such elements, however, remaining themselves unchanged.

In the present application I have specifically employed thermo-dynamic means energized, as stated, by transmitted heat from the source of heat of the lamp, but with electric incandescent lamps the said means might be energized by the electric current, and such an arrangement is set forth in an application filed by me March 29, 1915, Serial No. 17,805.

It is also evident that, with any type of lamp, mechanical means, suitably retarded, might be employed, and such means form the subject of other applications to be filed by me.

While I have specifically shown and described, in the present application, only such thermo-dynamic means as comprise the use of expansible metals, it is evident that any other form of thermo-dynamic device might be used, if desired.

In regard to electric lamps, it may be stated that those known as "gas filled" lamps are particularly adapted to my invention on account of the high temperature developed.

Figure 1:
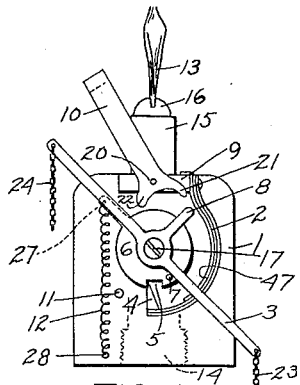
Figure 2:
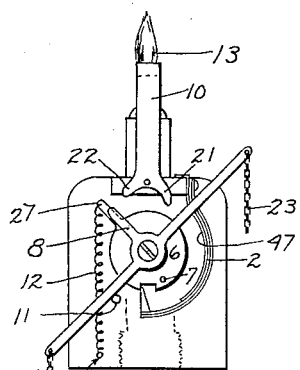
Figure 3:
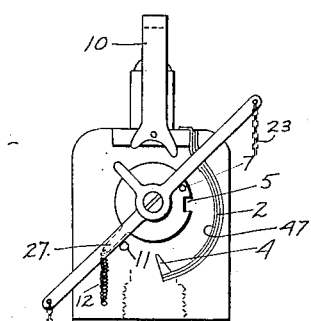
Figure 4:
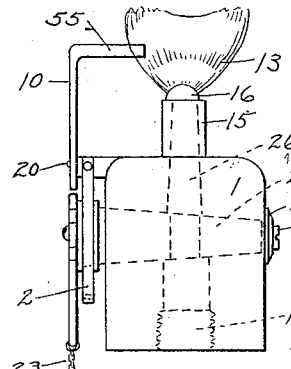
Figure 5:
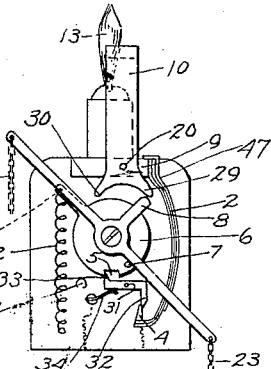
Figure 6:
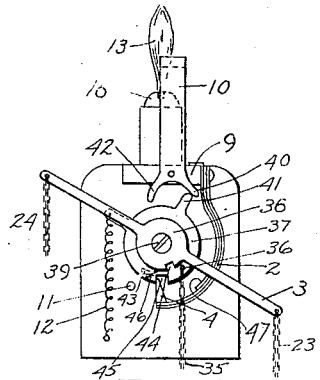
Figures 7, 8:
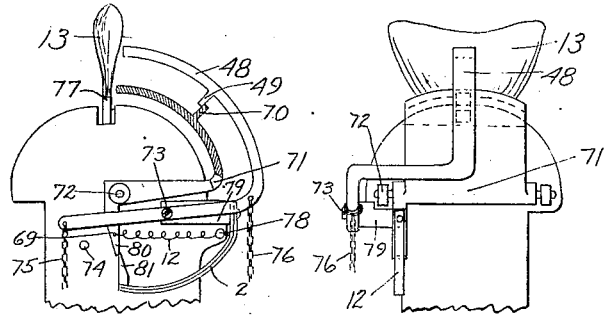
Figure 9:
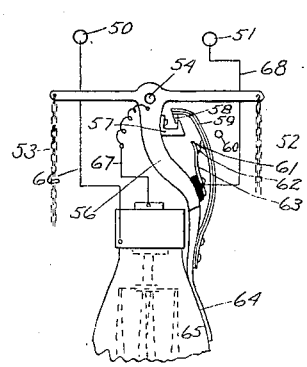
Figure 19:
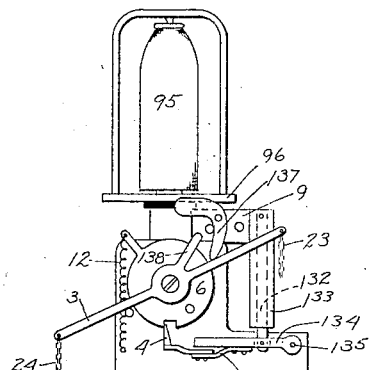
Figure 20:
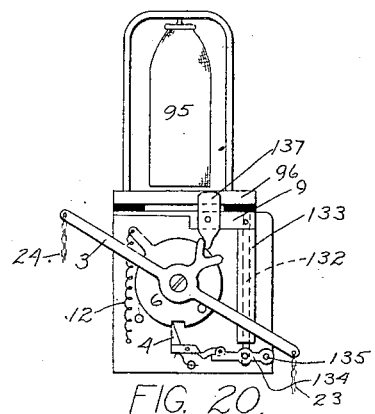
Fig. 20 shows same type of expansible rod as Fig. 19 but applied to a mantle burner in such manner as to cause the rod to be heated while the lamp is in operation. This arrangement, as before set forth, causes the gas to be shut off if the flame be blown out.
Figure 21:
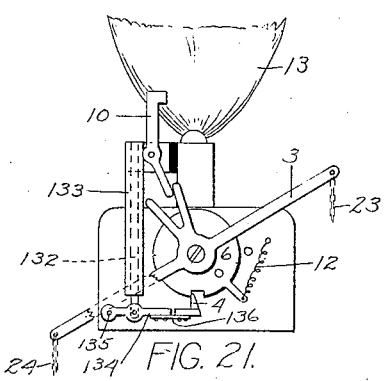
Fig. 21 illustrates the arrangement of Fig. 19 applied to an ordinary burner, the parts being shown after chain 24 has been pulled and before valve has been freed to close, the arm 3 being partially cut away for clearness.

In general, it is clear that the time interval, between actuation of the extinguishing means and actual extinguishment of the light, may readily be varied as desired by varying the rate of transmission of heat from the source of heat of the lamp to the thermo-dynamic device,—for instance, the devices shown in Figs. 1, 5, and 13, will of course give a longer time interval than those of Figs. 11, 12, 14, or 16. And that great latitude in this respect may be obtained by modifications of form of the said thermo-dynamic devices, and by the use of various materials for the parts acting to transmit heat thereto.

It is also clear that any thermo-dynamic device located upon a lamp structure is to some degree in thermal relation to the source of heat of the lamp, and I have defined, in general, such thermal relation changes as I employ as being those of "operative" thermal relation changes,—as for instance when the thermal circuit between the thermal device and the source of heat is interrupted, such interruption need only be to a degree sufficient to produce an "operative" thermal change in the thermal device.

The breadth of means employed to produce such operative changes I extend, as shown in Fig. 23, to the mechanical cooling, momentarily, of the thermal device by means of a cooling mass contacted therewith.

Wherever, therefore, in the subjoined claims, I speak of "altering" the thermal relation,—of a "change" of such relation,—of "relatively movable" thermal relation,—of "interrupting" the said relation,—or connection,—of "thermally relating" the thermal device to the source of heat of the lamp,—etc.,—these statements are to be construed upon the foregoing.

It is of course clear that the word "decrease" or the word "decreasing" as they appear in the specification and claims cover any degree of decrease to and including total extinguishment. As distinguished from the word "extinguish" which has the more limited meaning of total impairment or decrease of the light.

I claim as my invention:—

1. In a lamp adapted to generate heat as an attribute of light, in combination; means to decrease the useful light emitted by the lamp; thermo-dynamic means arranged to govern the said decreasing means; and means for operatively altering the heat-receiving disposition of the said thermo-dynamic means relative to the source of substantially constant heat of the lamp, without directly varying the latter.

2. In a lamp adapted to generate heat as an attribute of light, in combination; means tending to extinguish the lamp, means to restrain the said extinguishing means; and thermo-dynamic means to release the said restraining means; together with means for transmitting heat from the source of substantial constant heat of the lamp to the said thermo-dynamic means, and means for altering the operative disposition of said heat transmitting means relative to said source of heat, whereby the said thermo-dynamic means are actuated to release the said restraining means.

3. In a gas burner, in combination; means to decrease the supply of gas to the burner, and thermo-dynamic means to govern the said decreasing means;—the said thermo-dynamic means having a heat-receiving disposition operatively variable relative to the substantially constant flame of the burner.

4. In a gas burner including a valve, means to control the valve to decrease the supply of gas, thermo-dynamic means to govern the said controlling means, and means for moving the said thermo-dynamic means into operative thermal relation to the flame of the burner.

5. In a lamp adapted to generate light and heat, means tending normally to decrease the useful light emitted by the lamp, means to restrain the said decreasing means, thermo-dynamic means to control the said restraining means, and means for moving the said thermo-dynamic means into and out of operative thermal relation to the source of heat of the lamp.

6. In a lamp adapted to generate heat as an attribute of light, means to extinguish the lamp, thermo-dynamic means to control the operation of the said extinguishing means, and means to actuate the said thermo-dynamic means, the said actuating means comprising a movable thermo-conducive body adapted to transmit heat from the source of heat of the lamp to the said thermo-dynamic means.

7. In a lamp adapted to generate heat as an attribute of light, means to extinguish the light, means to actuate the said extinguishing means, a thermo-dynamic device to control the said actuating means, and a thermal connection between the said thermo-dynamic device and the source of heat of the lamp, the said thermal connection being arranged relatively movable to the said source of heat, whereby such movement alters the temperature of the said thermo-dynamic device to actuate the same and cause extinguishment of the lamp.

8. In a lamp adapted to generate heat as an attribute of light, means tending normally to extinguish the light; means adapted normally to restrain the said extinguishing means; thermo-dynamic means adapted, when actuated, to free the said restraining means; and means to vary the heat-receiving disposition of said thermo-dynamic means relative to the source of substantially constant heat of the lamp; thereby to produce a change of temperature in the said thermo-dynamic means adapted to actuate the same and to cause extinguishment of the light.

9. In a lamp adapted to generate light and heat, means normally tending to extinguish the light, means normally acting to restrain the said extinguishing means, thermo-dynamic means adapted when actuated to free the said restraining means, and means to place the said thermo-dynamic means in operative thermal relation to the source of heat of the lamp, whereby the said thermo-dynamic means are actuated and the lamp extinguished a predetermined time after the said thermal relation has been established.

10. In a gas burner including a valve therefor, means to open the valve, means to retain the said valve open, means tending to close the said valve, a thermo-dynamic device, normally out of operative thermal relation to the flame of the burner, adapted to free the said retaining means when actuated, and means for thermally relating the said thermo-dynamic device to the said flame, the said latter means being operated to make said thermal connection by a reversal of the said valve opening means.

11. In a gas burner including a valve therefor, means tending normally to close the said valve, means tending normally to restrain the said closing means, and a thermo-dynamic device, normally out of operative thermal relation to the flame of the burner, adapted when actuated to free the said restraining means; together with means to operatively relate the said thermo-dynamic device to the flame of the burner whereby the said thermo-dynamic device is actuated to free the said restraining means and permit the valve to close.

12. In a gas burner including a valve therefor, means to control the valve to open or close the same to any desired degree, spring means adapted, when energized, to close the said valve, means to retain the said spring means inoperative with respect to the valve when energized, a thermo-dynamic device to control the said retaining means, means to thermally relate the said thermo-dynamic device to the flame of the burner, means to alter the said thermal relation, and means adapted to actuate the said altering means and to energize the said spring means simultaneously, whereby the said thermo-dynamic device is operated to release the said retaining means and permit closure of the valve a predetermined time after the operation of the said latter altering and energizing means.

13. In a gas burner including a valve therefor, means to open the valve, spring means tending to close the valve, means to retain the valve open, and thermo-dynamic means adapted, when actuated, to free the said retaining means, the said thermo-dynamic means being normally out of thermal relation to the flame of the burner; together with means to thermally relate the said thermo-dynamic means to the said flame, the said latter means being operated by a reversal of the said valve opening means.

14. In a gas burner including a valve therefor, mechanism adapted to open the valve, when actuated in one direction, but inoperative with respect to the valve when actuated in the reverse direction, spring means normally tending to close the valve, a thermo-dynamic device normally adapted to retain the valve open and normally itself out of operative thermal relation to the flame of the burner, and means, operated by the valve mechanism when same is actuated in said reverse direction, to thermally relate the said thermo-dynamic device to the flame of the burner, whereby the valve is permitted to close.

15. In a gas burner including a valve therefor, means tending normally to close the valve, means normally active to restrain said closing means, a thermo-dynamic device adapted to free said restraining means, means to transmit heat from the flame of the burner to the said thermo-dynamic device, and means to vary in degree the said transmission of heat during normal operation of the burner;—whereby said thermo-dynamic device is actuated to permit closing of the said valve.

16. In a lamp adapted to generate heat as an attribute of light, means to extinguish the lamp and thermo-dynamic means arranged to govern the operation of the said extinguishing means, the said thermo-dynamic means being adapted to be operated by a change in its thermal relation to the source of heat of the lamp during the delivery of a substantially constant amount of energy to the said source of heat.

17. In a lamp adapted to generate heat as an attribute of light, means automatically to decrease the useful light emitted by the lamp, comprising means adapted to decrease the light, thermo-dynamic means operative to actuate the said decreasing means, and means to operatively alter the thermal relation of the said thermo-dynamic means to the source of heat of the lamp during the delivery of a substantially constant amount of energy to the said source of heat; together with manual controlling means adapted when moved to one position to turn on the lamp for continuous and normal operation and when moved to another position to operatively alter the said thermal relation; and further adapted, when moved to the said first mentioned position, to restore the original thermal relation.

18. A gas valve control apparatus embodying, in combination; a movable gas port control member; a relatively movable actuator element therefor adapted by one movement to establish said member continuously in port opening position; mechanism adapted automatically to move said member to port closing position; and normally inactive, slow-acting instrumentalities adapted to render said mechanism operative a substantial interval of time after said instrumentalities are operatively energized; together with means whereby another movement of said actuator element operatively energizes said instrumentalities.

19. A gas valve and burner control apparatus embodying, in combination; a movable gas port control member; a relatively movable actuator element therefor adapted by one movement to establish said member continuously in port opening position; mechanism adapted automatically to move said member to port closing position; and a normally deënergized thermostat adapted to render said mechanism operative a substantial interval of time after said thermostat is thermally energized; together with means whereby another movement of said actuator element causes thermal energization of the thermostat.

20. A self-contained gas burner and controlling valve arrangement comprising, in combination with the burner and valve, normally-inactive automatic means operatively related to the valve and adapted when released to actuate the same;—and single-acting means operatively related both to said valve and to said automatic means and adapted, upon suitable control movement, to establish the arrangement independently of said burner for indefinite, continuous operation of the latter and, upon another control movement, to render said automatic means operative to actuate said valve.

21. A self-contained gas burner and controlling valve arrangement comprising, in combination with the burner and valve, normally-inactive automatic means operatively related to the valve and adapted when energized and released to actuate the same;—and single-acting means operatively related both to said valve and to said automatic means and adapted, upon suitable control movement, to establish the arrangement independently of said burner for indefinite, continuous operation of the latter, and to energize and lock said automatic means, and, upon another control movement, to render said automatic means operative to actuate said valve.

22. A self-contained gas burner and controlling valve arrangement comprising, in combination with the burner and valve, normally-inactive automatic means operatively related to the valve and adapted when energized and released to actuate the same;—and single-acting means operatively related both to said valve and to said automatic means and adapted, upon suitable control movement, to establish the arrangement independently of said burner for indefinite, continuous operation of the latter, and to energize and lock said automatic means, and, upon reverse movement, to render said automatic means operative to actuate said valve.

23. A self-contained gas burner and controlling valve arrangement comprising, in combination with the burner and valve; controlling means adapted to adjust the valve to permit continuous operation of said burner; normally inactive automatic means operatively related to the valve and including a controlling thermostat normally arranged to be operatively remote from the heat of the burner flame,—the said means being adapted to actuate said valve upon energization of the thermostat; together with manually operable controlling means for subjecting said thermostat to the heat of the burner thereby thermally to energize same.

24. A gas valve control apparatus embodying, in combination; a movable gas port control member; a relatively movable actuator therefor adapted to establish said member in a port opening position; mechanism adapted automatically to move said member to a port-closing position; slow-acting instrumentalities adapted to render said mechanism operative a substantial interval of time after said instrumentalities are operatively energized; together with normally inactive means adapted to be rendered operative to energize said instrumentalities.

25. A self-contained gas burner and controlling valve arrangement comprising, in combination with the burner and valve, normally-inactive, automatic means operatively related to the valve and adapted when released to actuate the same, said automatic means, including a controlling thermostat—and single-acting controlling means operatively related both to said valve and to said automatic means and adapted, upon suitable control movement, to establish the arrangement for indefinite, continuous operation of the burner, and, upon further movement, to render said automatic means operative to actuate said valve.

26. A self-contained gas burner and controlling valve arrangement comprising, in combination with the burner and valve, normally-inactive automatic means operatively related to the valve and adapted when released to actuate the same, said automatic means including a controlling thermostat;—and single-acting, manually-operable, controlling means operatively related both to said valve and to said automatic means and adapted, upon suitable control movement to establish an arrangement for indefinite, continuous operation of the burner, and upon further movement to render said automatic means operative to actuate said valve.

27. A self-contained gas burner and controlling valve arrangement comprising, in combination with the burner and valve; normally-inactive automatic means operatively related to the valve and adapted when released to actuate the same, said automatic means including a controlling thermostat;—and single-acting, manually-operable, controlling means operatively related both to said valve and to said automatic means and adapted, upon suitable control movement, to establish the arrangement for indefinite, continuous operation of the burner, and, upon further movement, to render said automatic means operative to actuate said valve and to close the same.

28. A self-contained gas burner and controlling valve arrangement comprising, in combination with the burner and valve, normally-inactive, automatic means operatively related to the valve and adapted when released to actuate the same, said automatic means including a controlling thermostat;—and single-acting manually-operable, controlling means operatively related both to said valve and to said automatic means and adapted, upon suitable control movement, to establish the arrangement for indefinite, continuous operation of the burner, and to energize and lock said automatic means; and upon further movement to render said automatic means operative to actuate said valve and to close the same.

MALCOLM H. BAKER.

Witnesses:
RAYMOND D. SMITH,
SILVIO AMOROSO.